United States Patent
Kwon

(10) Patent No.: US 10,352,219 B2
(45) Date of Patent: Jul. 16, 2019

(54) METHOD OF CONTROLLING GENERATION OF SELECTIVE CATALYTIC REDUCTION ON DIESEL PARTICULATE FILTER

(71) Applicants: HYUNDAI MOTOR COMPANY, Seoul (KR); KIA MOTORS CORPORATION, Seoul (KR)

(72) Inventor: Choong-Il Kwon, Gunpo-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 21 days.

(21) Appl. No.: 15/681,855

(22) Filed: Aug. 21, 2017

(65) Prior Publication Data

US 2018/0283246 A1    Oct. 4, 2018

(30) Foreign Application Priority Data

Apr. 3, 2017  (KR) .................. 10-2017-0042822

(51) Int. Cl.
*F01N 3/20*  (2006.01)
*F01N 3/035*  (2006.01)
(Continued)

(52) U.S. Cl.
CPC ............. *F01N 3/208* (2013.01); *F01N 3/023* (2013.01); *F01N 3/035* (2013.01); *F01N 3/2006* (2013.01); *F01N 9/002* (2013.01); *F01N 2610/02* (2013.01); *F01N 2900/10* (2013.01); *F01N 2900/1404* (2013.01); *F01N 2900/1622* (2013.01); *Y02A 50/2325* (2018.01); *Y02T 10/24* (2013.01); *Y02T 10/47* (2013.01)

(58) Field of Classification Search
CPC .......... F01N 3/208; F01N 3/023; F01N 3/035; F01N 3/2006; F01N 2610/02
See application file for complete search history.

(56) References Cited

U.S. PATENT DOCUMENTS

2009/0056310 A1* 3/2009 Xu ..................... F01N 3/035
                                                         60/274
2009/0107118 A1* 4/2009 Ruona ................. F01N 3/029
                                                         60/286
(Continued)

FOREIGN PATENT DOCUMENTS

KR    10-2015-0096329 A    8/2015

*Primary Examiner* — Joseph J Dallo
(74) *Attorney, Agent, or Firm* — Morgan, Lewis & Bockius LLP

(57) ABSTRACT

A method of controlling regeneration of a selective catalytic reduction (SCR) on a diesel particulate filter (DPF) (SDPF) by using an increase in a temperature of exhaust gas of a vehicle include confirming whether the vehicle is in an idle state or whether the vehicle enters a re-start after a start-stop before the regeneration of the SDPF and determining an entrance condition, determining, when the entrance condition is satisfied, a quantity of urea injection and a quantity of urea accumulated before the regeneration and determining whether the determined quantity of urea injection does not exceed a target quantity of urea, and increasing a temperature within a filter of the SDPF to a predetermined value or more during the regeneration of the SDPF and removing urea deposited at the lower end portion of the filter.

5 Claims, 5 Drawing Sheets

(51) Int. Cl.
F01N 3/023 (2006.01)
F01N 9/00 (2006.01)

(56) References Cited

U.S. PATENT DOCUMENTS

| | | | | |
|---|---|---|---|---|
| 2010/0111774 | A1* | 5/2010 | Toshioka | B01D 53/9409 422/105 |
| 2010/0139254 | A1* | 6/2010 | Sebestyen | F01N 11/00 60/286 |
| 2011/0023462 | A1* | 2/2011 | Kurtz | F01N 3/035 60/286 |
| 2011/0283680 | A1* | 11/2011 | Gekas | B01D 53/944 60/274 |
| 2013/0031891 | A1* | 2/2013 | Ponnathpur | F01N 3/2066 60/274 |
| 2014/0182269 | A1* | 7/2014 | Jun | F01N 3/2066 60/274 |
| 2015/0276694 | A1* | 10/2015 | Lahr | F01N 3/208 73/1.06 |
| 2016/0281562 | A1* | 9/2016 | Miyairi | F01N 3/0222 |
| 2017/0074139 | A1* | 3/2017 | Nilsson | F01N 3/021 |
| 2017/0350294 | A1* | 12/2017 | Asaura | F01N 3/0807 |

\* cited by examiner

RELATED ART

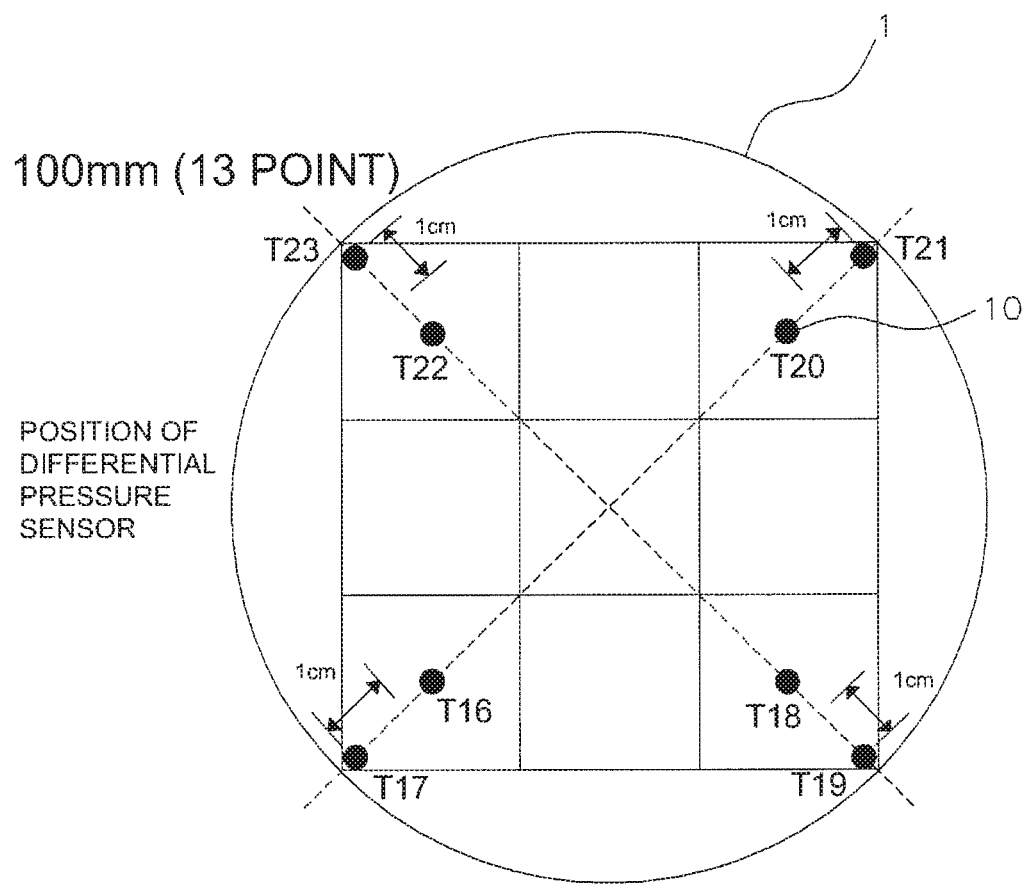

RELATED ART

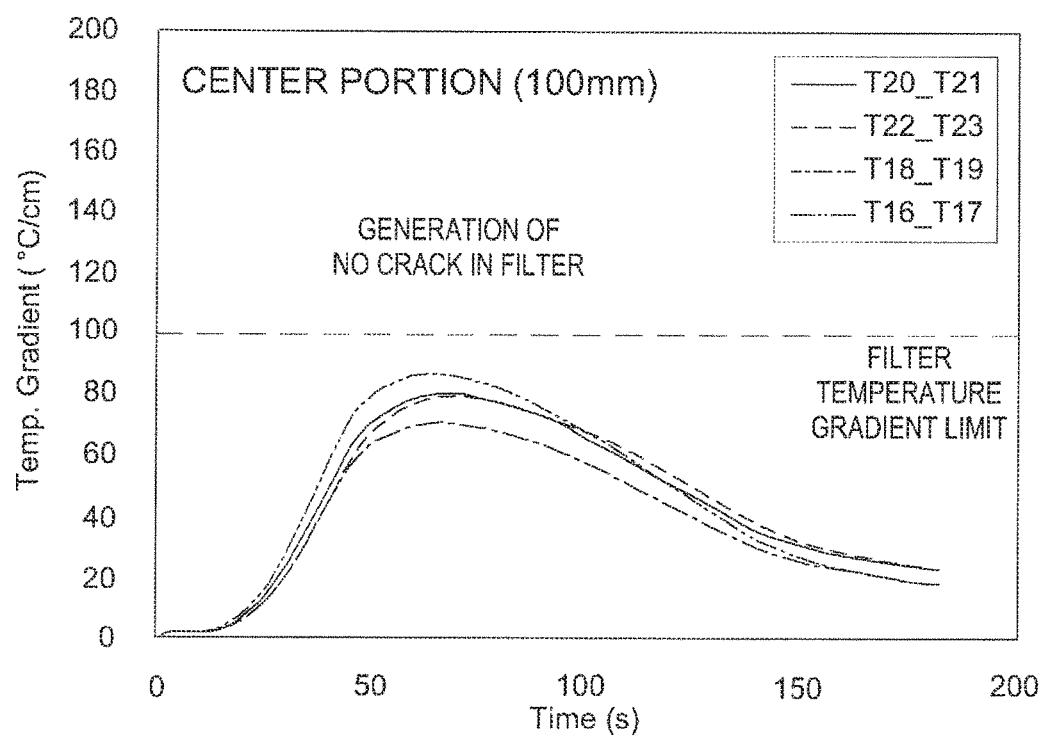

METHOD OF CONTROLLING GENERATION OF SELECTIVE CATALYTIC REDUCTION ON DIESEL PARTICULATE FILTER

CROSS-REFERENCE TO RELATED APPLICATIONS

This application claims the benefit of priority under 35 U.S.C. § 119 to Korean Patent Application No. 10-2017-0042822, filed on Apr. 3, 2017 with the Korean Intellectual Property Office, the disclosure of which is incorporated herein by reference in its entirety.

TECHNICAL FIELD

The present disclosure relates to a method of controlling regeneration of a selective catalytic reduction (SCR) on diesel particulate filter (DPF) (SDPF), and particularly, to a method of controlling regeneration of a filter through a temperature control by detecting injected urea during the regeneration of the SDPF.

BACKGROUND

In order to react to the strengthening of regulations of exhaust gas of a diesel engine in light duty vehicles, from the real driving emission (RDE) regulations, and the North American market, it is essential to decrease NoX. Particularly, a diesel vehicle needs to pass strict exhaust gas regulations, that is, the RDE regulation. According to a necessity in decreasing NoX, in order to purify NoX discharged from an engine, a lean NoX trap (LNT) or a selective catalytic reduction (SCR), that is, an exhaust gas purifying system, has been globally developed and applied. On the other hand, even though the light-duty diesel engine has excellent fuel efficiency, because of a high price of the diesel engine and an addition of the exhaust gas purifying system for reducing NoX, an exhaust gas purifying system, which has NoX purifying performance with high efficiency and is capable of decreasing material costs and weight, has been demanded. Accordingly, as a recently developed system in order to satisfy the demand, competitive companies have searched on S-DPFs, that is, systems, in which a diesel particulate filter (DPF) is coated with a selective catalytic reduction (SCR) catalyst, in which an SCR function is combined with a function of a DPF.

In this regard, Korean Patent Application Laid-Open No. 10-2015-0096329 (Method of Purifying Exhaust Gas of Diesel Engine) discloses a method of passing exhaust gas to be purified through an exhaust gas line including a diesel oxidation catalyst (DOC) converter for oxidizing gas-phase residual hydrocarbon (HC) and carbon monoxide (CO) to carbon dioxide ($CO_2$) and partially oxidizing nitrogen monoxide (NO) contained in exhaust gas to nitrogen dioxide ($NO_2$).

However, in the case of the SDPF positioned on an underfloor, during a start-off or in an idle condition during regeneration, a ring off crack may be generated in the filter by a temperature gradient difference between a temperature of a center portion inside the filter and a temperature of an outer portion inside the filter during the regeneration due to an excessive injection of urea.

BRIEF SUMMARY

The present disclosure has been made in an effort to control regeneration of a selective catalytic reduction (SCR) on a diesel particulate filter (DPF) (SDPF) by presenting a control logic of determining an accumulated quantity of urea injection before the regeneration and differentiating a regeneration temperature when the condition is satisfied, in order to prevent a crack of the SDPF due to an excessive injection of urea.

An exemplary embodiment of the present disclosure provides a method of controlling regeneration of a selective catalytic reduction (SCR) on a diesel particulate filter (DPF) (SDPF) by using an increase in a temperature of exhaust gas of a vehicle, the method including: confirming whether the vehicle is in an idle state or enters a re-start after a start-stop before the regeneration of the SDPF and determining an entrance condition; when the entrance condition is satisfied, determining a quantity of urea injection and an accumulated quantity of urea injection before the regeneration and determining whether the determined quantity of urea injection is a target quantity of urea, which generates a crack; and increasing a temperature within a filter of the SDPF to a predetermined value or more during the regeneration of the SDPF and removing urea deposited at a lower end portion of the filter.

The determining of the entrance condition may include determining whether there exists pre-generated urea, which generates the crack by a temperature deviation between a center portion and a lower end of the filter.

The determining of whether the determined quantity of urea injection is the target quantity of urea may include: determining whether a urea injector injects an allowable quantity of urea injection under the entrance condition; and determining whether the urea injector injects the accumulated quantity of urea injection, which generates a crack of the filter.

Whether the crack is generated in the SDPF may be varied according to the quantity of urea injection and the accumulated quantity of urea injection.

The removing of the urea may include: increasing a temperature of the filter so as to maintain 400° C. to 500° C. and gasifying or oxidizing the deposited urea during the regeneration of the SDPF; and increasing the temperature of the filter to at least 600° C. and removing soot generated by the gasification or the oxidation.

The removing of the urea may decrease the temperature deviation between the center portion and the lower end of the filter to prevent the crack.

The present disclosure including the aforementioned configuration has an advantage in controlling regeneration of the SDPF by determining an operation region of an engine and determining incomplete regeneration.

The present disclosure also has an advantage in controlling the regeneration of the SDPF by determining the quantity of urea injection and the accumulated quantity of urea injection before the regeneration.

BRIEF DESCRIPTION OF THE DRAWINGS

FIG. 3 is a diagram illustrating a state of measuring a quantity of urea injection of an exhaust gas port according to exemplary embodiments of the present disclosure.

FIG. 4B is a graph illustrating a case where a crack of a filter is prevented by a control method according to exemplary embodiments of the present disclosure.

DETAILED DESCRIPTION

Figure 1:
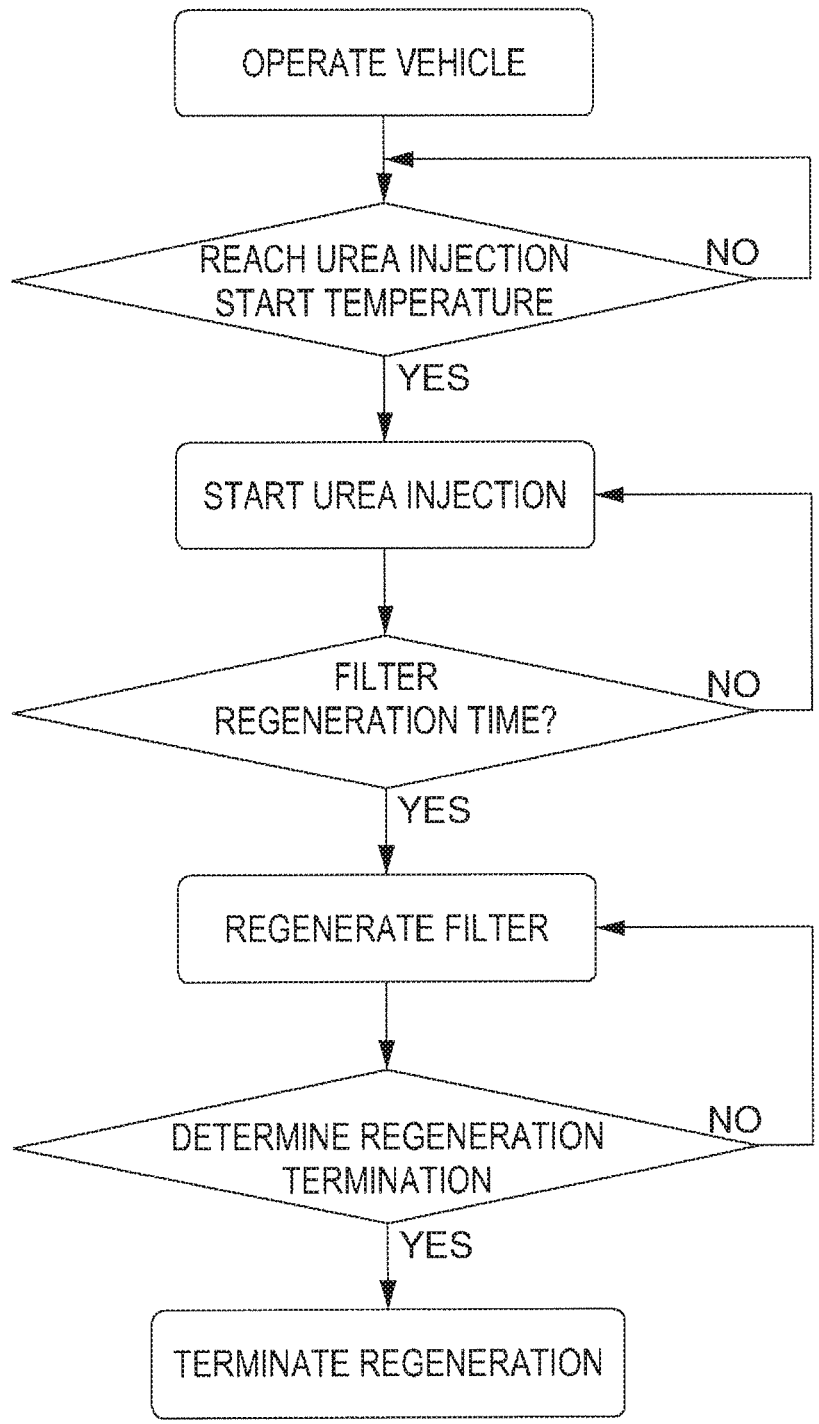
FIG. 1 is a flowchart illustrating a method of controlling regeneration of a selective catalytic reduction (SCR) on a diesel particulate filter (DPF) (SDPF) in the related art.

Hereinafter, the present disclosure will be described in detail with reference to the contents described in the accompanying drawings. However, the present disclosure is not restricted or limited by exemplary embodiments. Like reference numerals suggested in each drawing designate members which perform substantially the same functions.

The object and the effect of the present disclosure may be naturally understood or may become clearer through the description below, and the object and the effect of the present disclosure are not limited to the description below. In describing the present disclosure, a detailed explanation of a publicly known technology related to the present disclosure may be omitted so as to avoid unnecessarily obscuring the subject matter of the present disclosure.

FIG. 1 is a flowchart illustrating a method of controlling a selective catalytic reduction (SCR) on a diesel particular filter (DPF) (SDPF) in the related art. Referring to FIG. 1, when a filter of the SDPF in the related art is regenerated, the filter is regenerated without a determination on a vehicle operation condition, and thus there is no process for determining a quantity of residual urea. Accordingly, a crack may be generated by the residual urea.

An SDPF system for injecting urea in the related art may maximally inject urea that is a reducing agent for reducing NoX considerably discharged during the regeneration of the SDPF (a quantity of urea injection is in proportion to a quantity of NoX discharged). Further, in order to protect a urea injector from exhaust gas at a high temperature during the regeneration of the SDPF, the urea injector is cooled urea by an air-cooling type, and particularly, in a low temperature or idle condition, a cooling effect by the air-cooling type during the regeneration is not sufficient, such that cooling of the urea injector is additionally performed by maximally injecting the urea. A case where the urea is maximally injected corresponds to ① an idle case in which the quantity of flow is small and an exhaust gas temperature is low, and ② a case where a vehicle stalls during the regeneration of the filter, so that there is no flow of exhaust gas, and in these cases, urea may be excessively concentrated on a lower end portion of the SDPF. When the concentration of the urea is severe, the urea is deposited in a mat part of the lower end portion of the filter, such that a temperature deviation between a temperature of a center portion inside the filter and a lower outer portion of the filter becomes severe during the regeneration of the filter. As a result, a ring-off crack may be generated in the filter due to the excessive temperature deviation during the regeneration.

A silicon carbide (SiC) material that is a generally used material of the filter is damaged when the material is exposed to a very high temperature (1200° C. or higher) or when a temperature gradient (100° C./cm or more) is generated during the regeneration of the filter. In this case, a ring-off crack may be generated by an excessive temperature gradient between the center portion inside the filter and the lower end portion, in which the urea is deposited.

Figure 2:
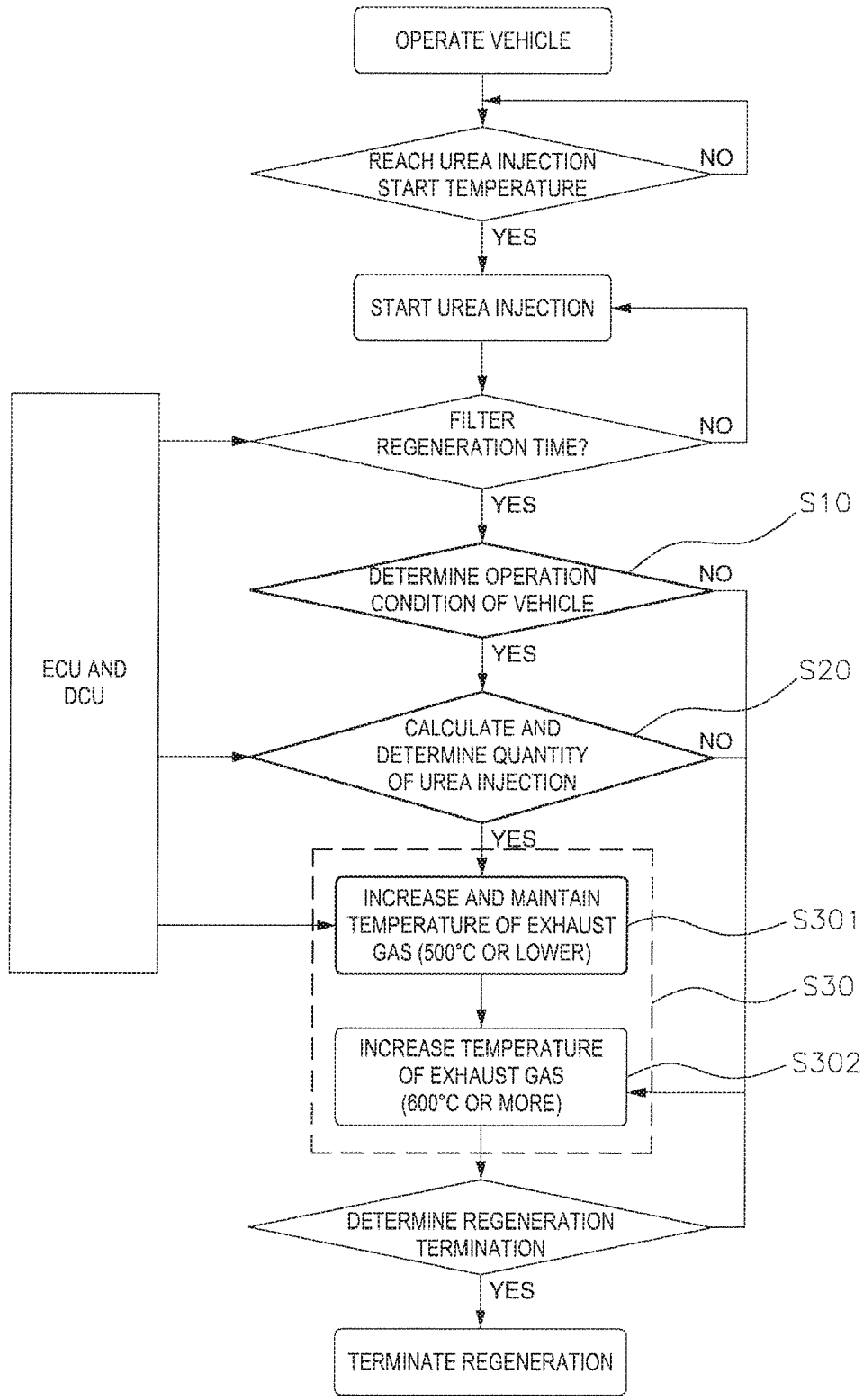
FIG. 2 is a flowchart illustrating a method of controlling regeneration of an SDPF according to exemplary embodiments of the present disclosure.

FIG. 2 is a flowchart illustrating a method of controlling regeneration of an SDPF according to exemplary embodiments of the present disclosure. Referring to FIG. 2, the method of controlling the regeneration of the SDPF may include determining an entrance condition, determining a target quantity of urea and removing urea.

The determining of the entrance condition is a process of confirming whether a vehicle is in an idle state or enters a re-start after a start-stop before the regeneration of the SDPF.

In general, a mechanism of generating a ring-off crack is described below. In the case of the regeneration of a normal filter, a temperature distribution is uniform. However, when a temperature difference is generated, a temperature distribution of the SDPF is changed, and expansion is different between the center portion and the lower portion, so that thermal expansion becomes differently incurred, or experienced, according to various materials. In this case, stress is changed, and a crack is generated by temperature non-uniformity.

The determining of the entrance condition is characterized in determining whether there exists pre-generated urea, which may generate a crack by a temperature deviation between the center portion and the lower end of the filter due to incomplete regeneration of the SDPF.

When the entrance condition is determined, whether to apply a logic, or a disclosed method, of the present disclosure may be preferentially determined. Accordingly, the logic of the present disclosure may be implemented by determining in advance the condition, under which the temperatures of the center portion, the lower end, and the outer portion of the filter are different from one another.

The entrance condition is a condition in which the SDPF enters the regeneration immediately after the urea is excessively injected, and the entrance condition may correspond to a case described below.

1) The case may be a case where during the regeneration of the SDPF, urea is maximally injected and then the vehicle stalls, and may be a case where there is no flow of exhaust gas, so that the injected urea is deposited in the lower end portion of the filter and is cooled to be aggregated in a mat and the lower end portion of the filter with condensate water.

2) The case may be a case where the urea is deposited in the lower end portion of the filter by the maximally injected urea in the idle state under the condition of a low exhaust gas flow rate and a low exhaust gas temperature in the case of the entrance of the idle state during the regeneration of the SDPF, and then the SDPF enters the regeneration by acceleration and the like.

3) The case may be a case where a quantity of ammonia absorbed is completely consumed when the vehicle travels, so that in order to fill a lacking quantity of ammonia in the idle state, the quantity of ammonia absorbed is filled by momentarily injecting a large quantity of urea in the idle state, and the SDPF immediately enters the regeneration and the like.

The determining of the target quantity of urea is a process of determining the quantity of urea injection and the accumulated quantity of urea injection before the regeneration when the entrance condition is satisfied, and confirming whether the determined quantity of urea is a quantity of urea, which may generate a crack.

The determining of whether the determined quantity of urea is the quantity of urea may include: determining whether a urea injector injects an allowable quantity of urea injection under the entrance condition; and determining whether the urea injector injects the accumulated quantity of urea injection, which may generate a crack of the filter.

The generation of the crack of the SDPF may be varied according to the quantity of urea injection and the accumulated quantity of urea injection Table 1 below represents the generation of the crack of the SDPF according to the quantity of urea injection.

TABLE 1

| | Quantity of urea injection (g) | Generation of crack of SDPF |
|---|---|---|
| ① | 12.5 | No crack |
| ② | 25 | Crack |
| ③ | 75 | Crack |
| ④ | 150 | Crack |

Herein, the quantity of urea injection, which may generate the crack of the filter, is determined by a league or engine test, and in the exemplary embodiment of the present disclosure, whether a crack is generated is determined by performing an evaluation according to the quantity of urea injection and a maximum quantity of urea injection is set as the target quantity. The quantity of urea injection is set so as not to exceed the target quantity. In exemplary embodiments of the present disclosure, the maximum quantity of urea injection is 25 g, which is the target quantity, and the value of 25 g may be changed according to a material of the filter, the quantity of catalyst, an engine operation condition and the like.

The removing of the urea is a process of increasing a temperature within the filter of the SDPF during the regeneration of the SDPF to a predetermined value or more and removing the urea deposited in the lower end portion of the filter. The removing of the urea may include a process of gasifying or oxidizing the urea and a process of removing soot by the gasification or the oxidization.

The deposited urea may be gasified or oxidized by increasing a temperature so that the temperature of the filter is maintained at 400 to 500° C. during the regeneration of the SDPF, and soot by the gasification or the oxidization may be removed by increasing the temperature of the filter to 600° C. or more. Further, it is possible to prevent a crack by decreasing a temperature deviation between the center portion and the lower end of the filter.

FIG. 3 is a diagram illustrating a state of measuring a quantity of urea injection of an exhaust gas port 1 according to exemplary embodiments of the present disclosure. Referring to FIG. 3, it is possible to measure the quantity of urea injection in the exhaust gas port 1, thereby preventing the generation of the crack in the related art. In the exemplary embodiments of the present disclosure, the quantity of urea injection is measured based on an engine of 2,500 cc.

Figure 4A:
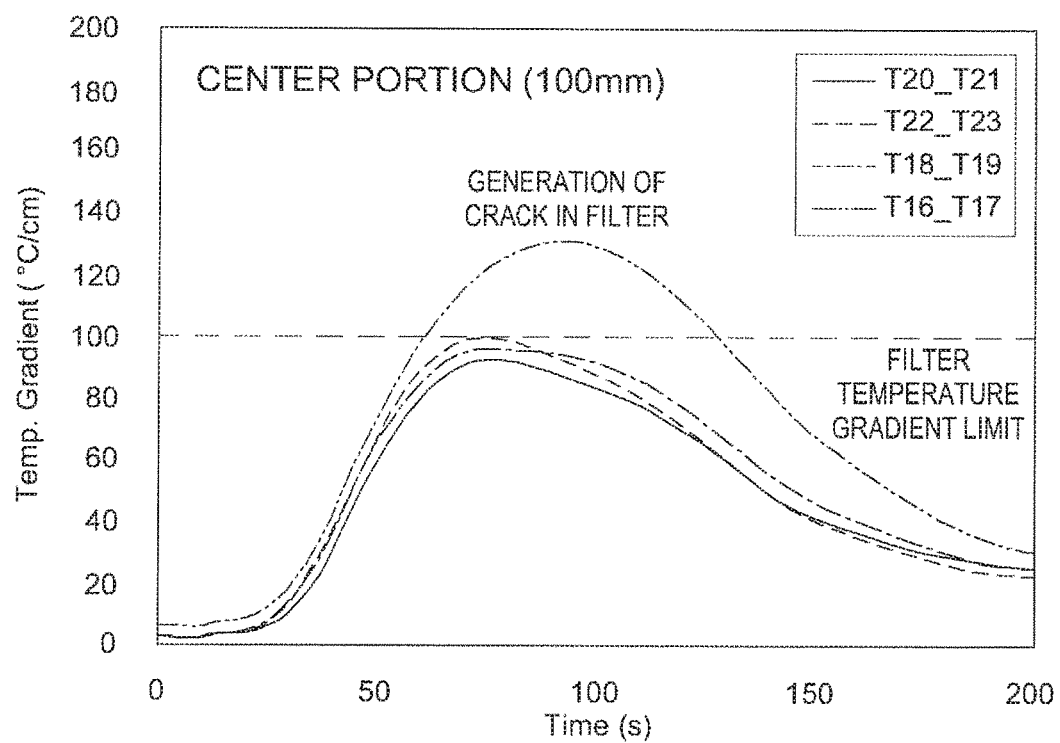
FIG. 4A is a graph illustrating a case where a crack is generated in a filter when a temperature exceeds a temperature gradient limit by a control method in the related art.

FIG. 4A is a graph illustrating a case where a crack is generated in a filter when a temperature exceeds a temperature gradient limit by a control method in the related art, and FIG. 4B is a graph illustrating a case where the regeneration of the filter is controlled by a control method according to exemplary embodiments of the present disclosure.

Referring to FIG. 4A, a temperature increases over time according to a quantity of urea injection for each position in FIG. 3. A temperature increases over time at each position, and when a temperature of the center portion exceeds a temperature gradient limit of the filter, a crack may be generated by a difference in the temperature gradient.

Referring to FIG. 4B, when the control method according to the exemplary embodiment of the present disclosure is used, it can be seen that a crack of the filter is not generated. Even though a temperature increases over time, the temperature does not exceed a temperature gradient limit of the filter, so that a crack may not be generated in the filter.

Accordingly, according to the exemplary embodiments of the present disclosure including the foregoing configuration, it is possible to prevent a crack by determining an operation region of the engine and determining incomplete regeneration, and prevent a crack by determining the quantity of urea injection and the accumulated quantity of urea injection before the regeneration.

In the foregoing, the present disclosure has been described in detail with reference to the representative exemplary embodiments, but those skilled in the art may understand that the exemplary embodiments may be variously modified without departing from the scope of the present disclosure. Accordingly, the scope of the present disclosure shall not be defined while being limited to the aforementioned exemplary embodiments, and the scope of the present disclosure shall not be limited to and defined by the described embodiments, but shall be defined by all of the changes or modified forms derived from the equivalent concepts to the claims, as well as the claims to be described below.

What is claimed is:

1. A method of controlling regeneration of a selective catalytic reduction (SCR) on a diesel particulate filter (DPF) (SDPF) by using an increase in a temperature of exhaust gas of a vehicle, the method comprising:
    confirming whether the vehicle is in an idle state or whether the vehicle enters a re-start after a start-stop before the regeneration of the SDPF and determining an entrance condition;
    determining, when the entrance condition is satisfied, a quantity of urea injection and a quantity of urea accumulated before the regeneration and determining whether the determined quantity of urea injection does not exceed a target quantity of urea; and
    increasing a temperature within a filter of the SDPF to a predetermined value or more during the regeneration of the SDPF and removing urea deposited at the lower end portion of the filter,
    wherein the step of determining whether the determined quantity of urea injection does not exceed the target quantity of urea includes:
    determining whether a urea injector injects an allowable quantity of urea injection under the entrance condition; and
    determining whether the urea injector injects the accumulated quantity of urea injection.

2. The method of claim 1, wherein the step of determining the entrance condition includes determining whether there exists pre-generated urea.

3. The method of claim 1, wherein whether a crack is generated in the SDPF is varied according to the quantity of urea injection and the accumulated quantity of urea injection.

4. The method of claim 1, wherein the step of removing the urea includes:
    increasing a temperature of the filter so as to maintain 400° C. to 500° C. and gasifying or oxidizing the deposited urea during the regeneration of the SDPF; and
    increasing the temperature of the filter to at least 600° C. and removing soot generated by the gasification or the oxidation.

5. The method of claim 4, wherein the step of removing the urea decreases the temperature deviation between the center portion and the lower end of the filter.

* * * * *